Oct. 28, 1924.

J. M. EDWARDS

ROASTING APPARATUS

Original Filed Oct. 21. 1920    3 Sheets-Sheet 1

1,512,978

INVENTOR
J. M. Edwards,
BY M. C. Lyddane
ATTORNEY

Oct. 28, 1924.

J. M. EDWARDS

ROASTING APPARATUS

Original Filed Oct. 21, 1920    3 Sheets—Sheet 3

1,512,978

INVENTOR
J. M. Edwards,
BY
M. C. Lyddane
ATTORNEY

Patented Oct. 28, 1924.

1,512,978

UNITED STATES PATENT OFFICE.

JAMES M. EDWARDS, OF NEW YORK, N. Y.

ROASTING APPARATUS.

Application filed October 21, 1920, Serial No. 418,378. Renewed March 15, 1924.

*To all whom it may concern:*

Be it known that I, JAMES M. EDWARDS, a citizen of the United States, residing at New York, in the county of New York and State of New York, have invented certain new and useful Improvements in Roasting Apparatus, of which the following is a specification:

This invention relates to an improved roasting apparatus and more particularly to a coffee roaster.

Broadly considered, the present invention contemplates the provision of an apparatus for quickly and properly roasting coffee with a minimum consumption of fuel.

The present apparatus is primarily designed for the purpose of utilizing a gas flame for the production of a roasting heat, and the apparatus is so constructed that a gas flame or jet of relatively small size is so directed as to operate most effectively in the roasting of coffee beans.

The invention also comprehends the provision of an apparatus having a roasting drum and a preheating drum arranged in superposed relation to the roasting drum, and means for delivering the heat from the roasting drum chamber to the preheating drum.

It is also one of the secondary objects of the invention to provide simple and effective means for disposing of the "silver skins" and other foreign matter before transferring the coffee beans from the preheating drum to the roasting drum.

In detail, the present invention consists of improved means for controlling the feed of the green coffee beans to the preheating drum and manually controllable means for delivering the preheated beans from said drum into the roasting drum.

Having the aforementioned objects in view, the present invention comprehends certain novel and improved combinations of mechanical elements, and the structural characteristics thereof, as will be more fully developed in the following description and subsequently incorporated in the subjoined claims.

Figure 1:
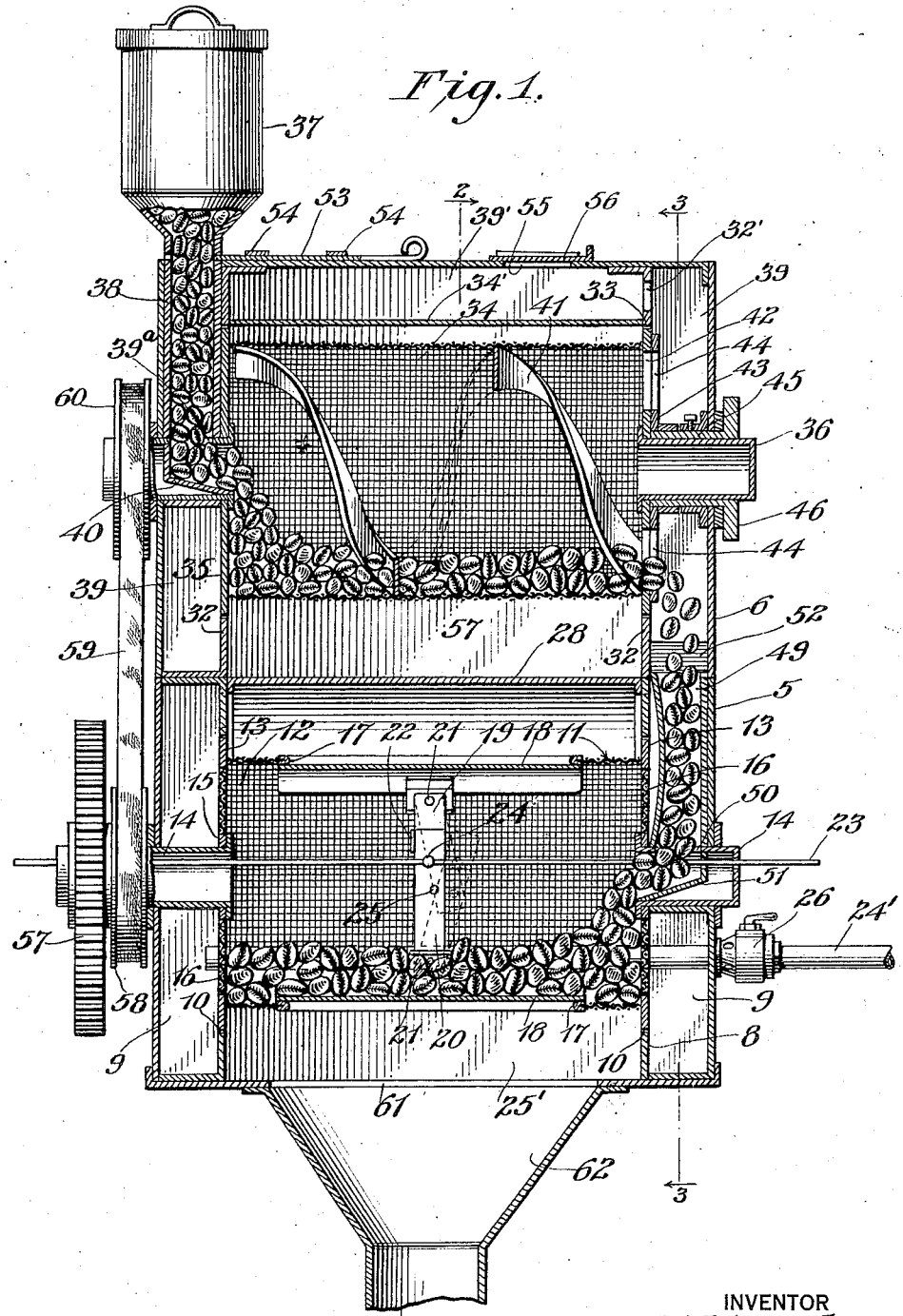
Figure 1 is a vertical sectional view through an apparatus illustrating one embodiment of my invention.

Referring in detail to the drawings, 5 and 6 respectively, indicate lower and upper housing sections which are arranged in superposed relation, and are held in their proper assembled positions by means of suitable keepers shown at 7. It will be understood that in lieu of these keeper devices, any other preferred fastening means for the housing sections may be provided.

In spaced relation to each end of the lower housing section 5, a vertical partition plate 8 is suitably arranged and secured, said plates in conjunction with the end walls of the housing section providing the end chambers 9. Each of the plates 8 is formed with a circular opening 10 for a purpose which will presently appear.

11 designates the roasting drum, the body wall of which is of foraminous construction, said wall in the illustrated embodiment of the invention being disclosed in the form of a reticulated wire fabric 12. This wire fabric is secured at its ends to the annular heads 13. The trunnions 14 of the drum are of hollow or tubular construction and at their inner ends are fixed to the central annular plates 15. These plates are connected to the annular head plates 13 by means of the relatively coarse and stiff wire mesh walls 16. The drum heads fit within the openings 10 in the vertical walls 8.

The roasting drum 11 is provided in its body wall 12 at diametrically opposite sides with the outlet openings 17 which are closed by means of the hinged doors 18 arranged within the drum. To the free edge of each of these doors links 19 and 20 respectively are pivotally connected as at 21. The link 19 has a lug 22 formed on one of its edges which acts as a stop when engaged by the other of said links to limit the relative pivotal movement of the links in one direction. An operating rod 23 is pivotally connected as at 24 to the link 20 and extends through the hollow trunnions 14 of the drum. The links 19 and 20 are pivotally connected to each other as at 25 and it will be noted that when the doors 18 are closed, this pivot is located out of vertical alignment with the pivot 24 and the pivots 21. Thus the toggle links are substantially locked against casual relative movement in the position seen in Figure 1 so that the doors are held tightly closed.

24' designates a gas supply pipe which extends longitudinally through the roasting chamber 25' and at one side of and below the center or the axis of the roasting drum 11. This supply pipe is equipped with a suitable air mixing valve 26 and is provided with any desired number of jet nipples 27 which deliver the gas flame upwardly and inwardly in radial relation to the roasting drum and against that side thereof whereon the coffee beans will collect as the drum is rotated in the direction indicated by the arrow in Figure 2 of the drawings.

The top wall of the roasting chamber 25 is formed by a curved plate 28 which extends the entire length of said chamber over the roasting drum and downwardly at the opposite sides of the drum to a point approximately in line with its axis. From the lower end of each side portion of the plate, said plate is extended outwardly as at 29 and suitably secured to the side walls of the housing section 5. In this manner, it will be seen that longitudinally extending chambers 30 are formed at each side of the roasting drum, which are open at their upper ends and in communication with the interior of the upper housing section 6. Each of the vertical plates 8 is formed with slots 31 which afford communication between these chambers 30 and the end chambers 9.

The upper housing section 6 is also provided with the vertical walls 32 in spaced relation to its end walls in a similar manner to the lower housing section, and these walls 32 are likewise formed with the circular openings 33 to receive the heads 35 of a preheating drum 34. The body wall of this drum consists of a reticulated fabric or other foraminous material. The supporting trunnions 36 for the drum are fixed at their inner ends to the drum heads and are rotatably mounted in the end walls of the housing in a similar manner to the mounting of the roasting drum 11.

37 designates a feed hopper having a spout or tube 38 extending downwardly into one of the end chambers 39 formed between the end walls of the housing section and the plates 32. The lower end of this discharge tube is adapted to communicate with an opening 39ᵃ provided in one of the hollow drum trunnions 36 and within said trunnion a directing plate 40 is arranged whereby the coffee beans are directed through the hollow trunnion and into the preheating drum 34. To the wall of this drum, a spiral blade 41 is suitably secured and as the drum rotates, the coffee beans are gradually moved longitudinally to the opposite end of the drum. At this end, the drum head 35 is formed with a plurality of openings 42. These openings are adapted to be opened and closed by means of the valve plate 43 engaged against the outer side of the head and provided with a series of similar openings 44. This valve plate is fixed to the inner end of a sleeve 45 rotatably engaged upon the trunnion 36, said sleeve being provided with a head 46 on its outer end whereby it may be conveniently rotated. In the outer portion of the valve plate, a circumferentially extending slot 47 is formed to receive a pin 48 fixed in the drum head. This pin limits the movement of the valve plate in each direction to open or close communication between the openings 42 in the drum head and the end chamber 39.

In the corresponding end chamber 9 of the lower housing section, a tube 49 is secured and communicates at its lower end with an opening 50 in one of the trunnions 14 of the roasting drum. This trunnion is also provided with a directing plate 51 whereby coffee beans are directed into the roasting drum. When the coffee beans are discharged from the upper preheating drum 34, they fall upon the inclined plates 52 which are arranged transversely in the lower end of the chamber 39 and cause the beans to gravitate downwardly into the tube 49.

A horizontal partition plate 34' extends between the vertical walls 32 above the drum 34 and provides a chamber 39' which is in communication with one or both of the end chambers 39 through the openings 32' formed in the walls 32.

Figure 3:
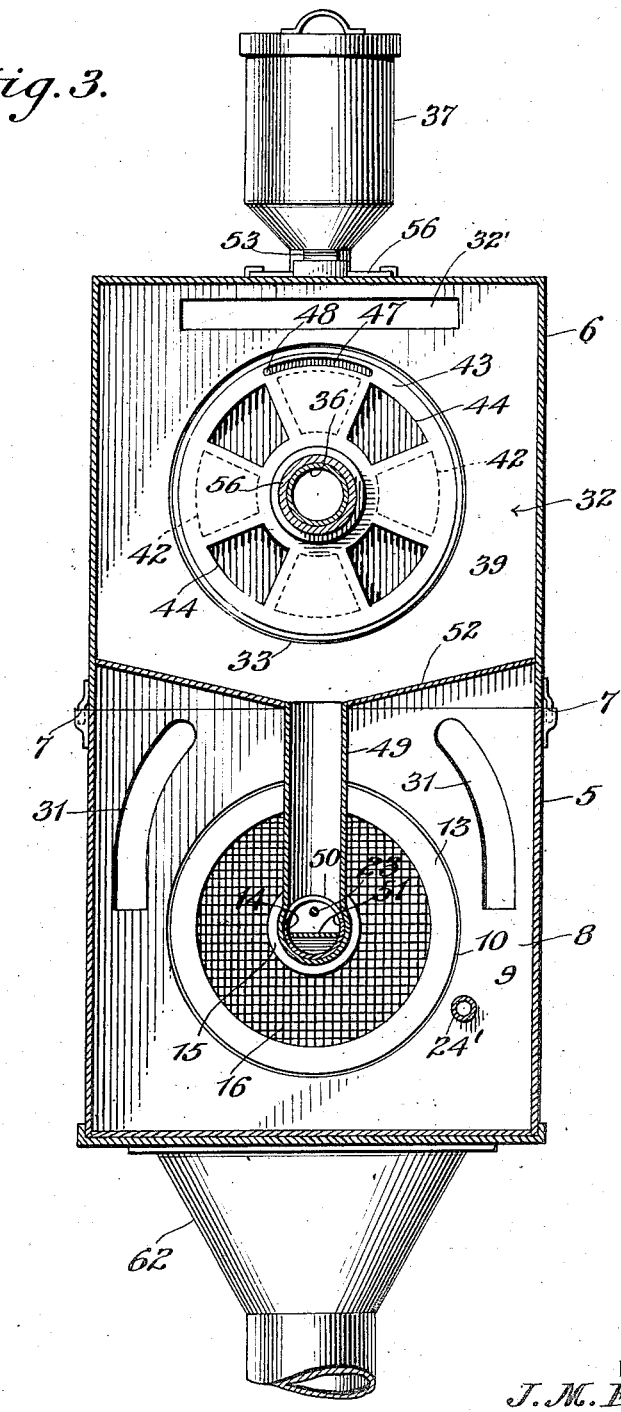
Figure 3 is a similar view taken on the line 3—3 of Figure 1.

When it is desired to discontinue the continuous feed of the coffee beans through the upper preheating drum and into the roasting drum, the valve plate 43 may be turned to the position seen in Figure 3 of the drawings and the further gravity movement of the beans from the hopper 37 prevented by means of a slide plate 53 mounted in suitable guides 54 on the top wall of the housing section 6, the end of said plate traversing the tube 38. The top wall of the housing section is also provided with an opening 55 and a sliding damper plate 56 whereby the heat may be released from the chamber 39', or its flow through said chamber regulated in order to maintain the preheating chamber 57 at a desired temperature.

Power may be applied for rotating the drums in any desired manner, but I have herein shown a driven gear 57 fixed upon one of the trunnions 14 of the roasting drum. A belt wheel 58 is also fixed upon said trunnion and connected by means of the endless belt 59 to a similar wheel 60 fixed upon the corresponding trunnion 36 of the pre-heating drum.

The bottom wall of the lower housing section 5 is provided with an opening 61 through which the roasted coffee beans are discharged into an outlet pipe or tube 62 which conveys the roasted beans to a suitable cooling apparatus.

Figure 2:
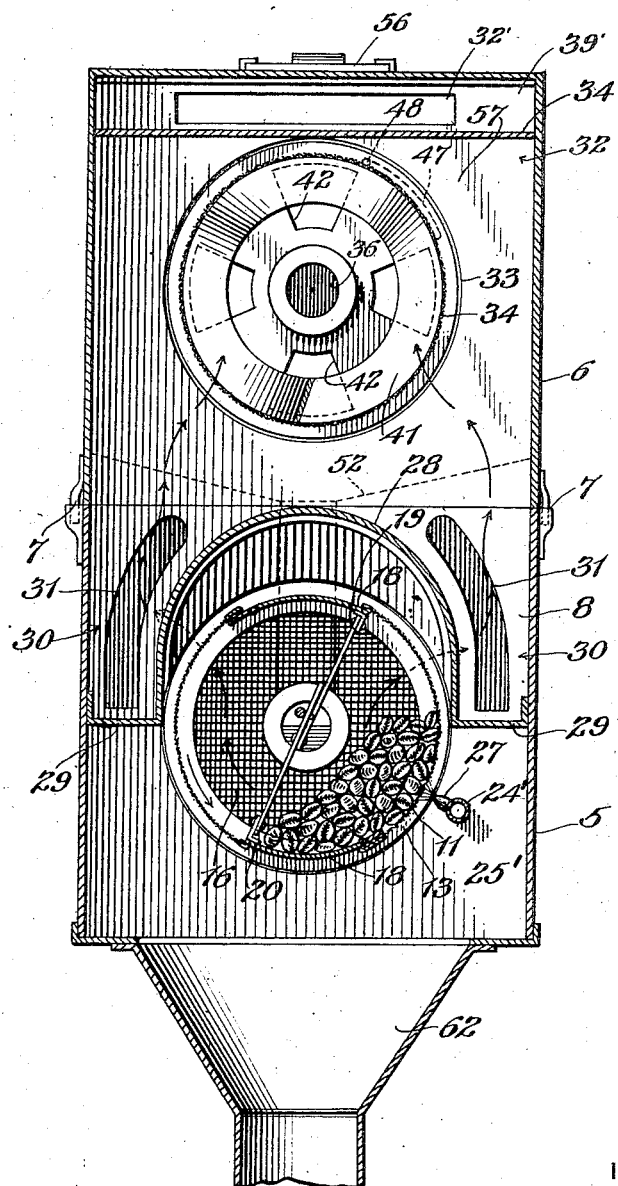
Figure 2 is a transverse vertical section taken on the line 2—2 of Figure 1.

In the operation of my improved roaster, it will be understood that as the roasting drum 11 is continuously rotated, the beans therein are agitated and continually moved relative to each other. Owing to the centrifugal force caused by the rotation of the drum, the beans will tend to collect upon one side of the axial center of the drum towards the direction of rotation as shown in Figure 2, at which point they are in proximity to the series of gas jets. Due to this fact, I am enabled to quickly and thoroughly roast the coffee beans with a jet flame of minimum length. Therefore, the expense incident to the consumption of gas in the operation of the apparatus will be correspondingly reduced. The heat rising through the wall of the roasting drum, strikes the top wall 28 of the drum chamber and collects within the upper portion of the drum from which it passes through the relatively coarse wire mesh end walls 16 into the end chambers 9. From these end chambers, the heated air takes the course indicated by the arrows in Figure 2 and passes through the slots 31 into the side chambers 30, and hence upwardly into the chamber 57. This heated air is therefore utilized for the purpose of preheating the coffee beans so that their subsequent roasting in the lower drum 11 will be facilitated. This preheating of the beans also serves to loosen the thin outer coating or "silver skin" on the bean, and this skin or chaff together with other foreign matter, finds an escape through the reticulated wall of the drum 34. This material falling upon the curved top wall 28 of the roasting chamber 25, is directed transversely by said wall and collects in the side chambers 30 from which it may be periodically removed.

The heated air may be retained in the chamber 57 by closing the valve plate 43 until the desired temperature is obtained in the preheating drum. The valve is then opened so that the air may escape through the openings 42 and 32' into the chamber 39' as it is replaced by the heated air rising from the roasting drum chamber. In this manner a constant uniform temperature may be maintained in each of the drum chambers.

From the foregoing description taken in connection with the accompanying drawings, it is believed that the construction, manner of operation and several advantages of my improved roasting apparatus will be clearly and fully understood. While the invention is primarily designed for the roasting of coffee beans, it may also be advantageously employed for the roasting of cocoa beans, and various other edible commodities. The preheating and roasting drums may be of any desired capacity, and while I have herein illustrated and described a particular means for effecting the continuous feed of the beans through the preheating drum and into the roasting drum, it is to be understood that other feeding means may be substituted therefor, within the scope of the present invention. As the two housing sections and the various structural features thereof may be inexpensively produced from sheet metal, it will be appreciated that the apparatus in its entirety may be manufactured and marketed at relatively small cost.

In the preceding description and the accompanying drawings I have disclosed one practical embodiment of the invention, which, however, may likewise be exemplified in numerous alternative constructions. Accordingly the invention as herein claimed is to be considered as inclusive of all legitimate equivalents for the various elements employed as well as other contemplated arrangements thereof, which may satisfactorily accomplish the desired results.

I claim:

1. In a roasting apparatus, preheating and roasting chambers arranged in superposed relation to each other, a foraminous drum rotatably mounted in each of said chambers, means for delivering a roasting flame directly against the wall of the roasting drum and the material therein, an air receiving chamber above the preheating chamber, means for controlling the passage of heated air from the preheating drum into said latter chamber and means for effecting a continuous feed of the material through the preheating drum and into the roasting drum.

2. In a roasting apparatus, preheating and roasting chambers arranged in superposed relation to each other, a foraminous drum rotatably mounted in each of said chambers, means for delivering a roasting flame directly against the wall of the roasting drum and the material therein, means for directing the heated air currents ascending through the roasting drum into the preheating chamber, means for controlling the temperature in the latter chamber and means for effecting a continuous feed of the material through the preheating drum and into the roasting drum.

3. In a roasting apparatus, preheating and roasting chambers arranged in superposed relation, a foraminous drum rotatably mounted in each of said chambers, means extending through the roasting chamber for directing a plurality of flame jets directly against the wall of the roasting drum and the material therein, and means for directing the heated air currents ascending through the roasting drum into the preheating chamber.

4. In a roasting apparatus, preheating and roasting chambers arranged in superposed relation, a foraminous drum rotatably mounted in each of said chambers, a chamber at each end of the roasting chamber, additional chambers at the opposite sides of the roasting chamber and in connection with the preheating chamber and with said end chambers, said roasting drum having foraminous end walls, and heating means for the roasting chamber, the heated air currents ascending through the roasting drum and the end walls thereof and through said end and side chambers into the preheating chamber.

5. In a roasting apparatus, upper and lower housing sections, said lower housing section having vertical walls therein affording a roasting chamber, and additional chambers at the ends of the roasting chamber, a drum rotatably mounted in the roasting chamber and having heads disposed in the plane of said vertical walls, a top wall for the roasting chamber having base flanges secured to the side walls of the housing and affording a chamber at each side of the roasting chamber, said vertical walls having openings therein affording communication between the end and side chambers, and said side chambers opening at their upper ends into the upper housing section, a foraminous preheating drum rotatably mounted in the upper housing section, and heating means within the roasting chamber, said roasting drum having foraminous head sections through which the ascending heated air may pass into the end chambers, and hence through said side chambers and upwardly through the preheating drum.

6. In a roasting apparatus, a roasting drum having outlet openings in its wall, hinged doors arranged within the drum, toggle link connections between said hinged doors, and an operating element for actuating the toggle link connections to move the doors to their open or closed positions.

7. In a roasting apparatus, a roasting drum having outlet openings in its wall, hinged doors arranged within the drum, toggle link connections between said hinged doors, and an operating rod extending axially through the drum and pivotally connected to one of the toggle link members to actuate the latter and move the doors to their open or closed positions.

8. In a roasting apparatus, preheating and roasting chambers arranged in superposed relation, a foraminous drum rotatably mounted in each of said chambers, means extending through the roasting chamber for directing a roasting flame directly against the wall of the roasting drum and the material therein, means for directing the heated air currents ascending through the roasting drum into the preheating chamber and means for controlling the passage of the heated air through the preheating drum to obtain a desired temperature therein.

9. In a roasting apparatus, upper and lower housing sections, said lower housing section having vertical walls therein affording a roasting chamber, and additional chambers at the ends of the roasting chamber, a drum rotatably mounted in the roasting chamber and having heads disposed in the plane of said vertical walls, a top wall for the roasting chamber having base flanges secured to the side walls of the housing and affording a chamber at each side of the roasting chamber, said vertical walls having openings therein affording communication between the end and side chambers, and said side chambers opening at their upper ends into the upper housing section, a foraminous preheating drum rotatably mounted in the upper housing section, said latter housing section having a chamber above the preheating drum and communicating with said drum through one end thereof, manually operable means for controlling the passage of heated air from the drum into said chamber, and heating means within the roasting chamber, said roasting drum having foraminous head sections through which the ascending heated air may pass into the end chambers, and hence through said side chambers and upwardly through the preheating drum.

In testimony whereof I affix my signature.

JAMES M. EDWARDS.